(12) United States Patent
Medina, III et al.

(10) Patent No.: US 8,249,899 B1
(45) Date of Patent: Aug. 21, 2012

(54) SYSTEMS AND METHODS FOR ACCIDENT NOTIFICATION

(75) Inventors: Reynaldo Medina, III, San Antonio, TX (US); Charles L. Oakes, III, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 279 days.

(21) Appl. No.: 12/098,005

(22) Filed: Apr. 4, 2008

(51) Int. Cl.
G06Q 40/00 (2012.01)
B60Q 1/00 (2006.01)
G08G 1/01 (2006.01)
G06F 11/00 (2006.01)

(52) U.S. Cl. ............... 705/4; 714/25; 340/438; 340/933
(58) Field of Classification Search .................. None
See application file for complete search history.

(56) References Cited

U.S. PATENT DOCUMENTS

| | | | | |
|---|---|---|---|---|
| 3,656,111 | A * | 4/1972 | Royster, Sr. | 340/426.11 |
| 6,397,334 | B1 * | 5/2002 | Chainer et al. | 713/176 |
| 6,472,982 | B2 | 10/2002 | Eida et al. | 340/539.1 |
| 7,333,012 | B1 * | 2/2008 | Nguyen | 340/539.1 |
| 7,356,394 | B2 * | 4/2008 | Burgess | 701/29.3 |
| 2002/0002475 | A1 * | 1/2002 | Freedman et al. | 705/4 |
| 2003/0233261 | A1 | 12/2003 | Kawahara et al. | 705/4 |
| 2004/0066273 | A1 * | 4/2004 | Cortina et al. | 340/5.1 |
| 2005/0009122 | A1 * | 1/2005 | Whelan et al. | 435/7.32 |
| 2005/0035852 | A1 * | 2/2005 | Paulsen | 340/438 |
| 2005/0108065 | A1 * | 5/2005 | Dorfstatter | 705/4 |
| 2005/0112275 | A1 * | 5/2005 | Rodriguez | 427/157 |
| 2005/0155213 | A1 * | 7/2005 | Eastin | 29/593 |
| 2005/0223286 | A1 * | 10/2005 | Forster | 714/25 |
| 2005/0234823 | A1 * | 10/2005 | Schimpf | 705/50 |
| 2006/0125641 | A1 * | 6/2006 | Forster | 340/572.8 |
| 2006/0180647 | A1 * | 8/2006 | Hansen | 235/375 |
| 2006/0212195 | A1 | 9/2006 | Veith et al. | 701/35 |
| 2006/0273922 | A1 | 12/2006 | Bhogal et al. | 340/901 |
| 2007/0018830 | A1 * | 1/2007 | Inoue et al. | 340/572.4 |
| 2007/0029994 | A1 * | 2/2007 | Dembo | 324/158.1 |
| 2007/0094089 | A1 * | 4/2007 | Wilbrink et al. | 705/26 |
| 2007/0159330 | A1 * | 7/2007 | Chakraborty et al. | 340/572.1 |
| 2007/0229307 | A1 * | 10/2007 | Pawlenko et al. | 340/933 |
| 2007/0255608 | A1 * | 11/2007 | Igler | 705/8 |
| 2007/0281657 | A1 * | 12/2007 | Brommer et al. | 455/334 |
| 2007/0282716 | A1 * | 12/2007 | Branigan et al. | 705/28 |
| 2009/0265193 | A1 * | 10/2009 | Collins et al. | 705/4 |
| 2009/0295537 | A1 * | 12/2009 | Lane et al. | 340/5.82 |
| 2010/0063775 | A1 * | 3/2010 | Colling | 702/182 |

OTHER PUBLICATIONS

Tag, you're it: radio frequency identification technology may soon help insurers track documents, stolen items, patients, medical histories, prescription drug use and more; Best's Review, v107, n2, Jun. 2006; 5-pages.*

(Continued)

*Primary Examiner* — Gregory Johnson

(74) *Attorney, Agent, or Firm* — Schwegman, Lundberg & Woessner, P.A.

(57) ABSTRACT

The described embodiments contemplate a system, method and computer-readable medium with computer-executable instructions for accident notification. The novel system includes subsystems for testing an automobile, or a part of an automobile, and comparing the result of the test with a baseline result. The test may use various detectors, including radio frequency identification tags embedded in the paint of an automobile, magnetic variances caused by metal deformation, or electrical changes in a circuit. The test may be used for various purposes, including determining that an accident has occurred, verifying the authenticity of a repair part, or for processing an insurance claim.

21 Claims, 8 Drawing Sheets

OTHER PUBLICATIONS

Parts tracing drives automotive supply chain: government regulations and rising recall costs force suppliers to get a better handle on parts data; Frontline Solutions, v6, n3, Apr. 2005; 6-pages.*

OnStar [Retreived on Feb. 22, 2008], Retreived from the internet <http://acme.highpoint.edu/~msmith/teaching/HallOfFame/On%20Star__2005Fall.pdf>.

* cited by examiner

SYSTEMS AND METHODS FOR ACCIDENT NOTIFICATION

CROSS-REFERENCE

This application is related by subject matter to the subject matter disclosed in the following commonly assigned applications, the entirety of which are hereby incorporated by reference herein: U.S. patent application Ser. No. 12/062,831, and U.S. patent application Ser. No. 12/098,136, each filed on and each entitled "Systems and Methods for Accident Notification."

BACKGROUND

Insurance and consumer fraud is an increasing problem to both consumers and insurance companies. As the flow of goods from unknown sources increase, the potential for fraud increases accordingly. In the automobile industry, insurance and consumer fraud is becoming increasingly problematic and more difficult to detect. For example, after a major natural disaster, such as a hurricane, cars that were flooded and physically damaged during the storm may be transported from the area, cosmetically repairs, and resold in car lots to unsuspecting consumers. These cars may have had extensive water and physical damage, but are retouched enough to perhaps fool an unwary consumer.

In another example, a car may be involved in an accident. The damage may have been extensive enough that the car was totaled and is structurally unsafe to drive. Unscrupulous individuals, though, may buy the car at auction, do some cosmetic repairs, fraudulently "clean up" the title, and then sell the car to unknowing consumers. In a further example, a person may take his or her car into the shop for repair to replace a body panel damaged in an accident. A body shop may replace the panel with a substandard, unapproved, cheap part but claim to the consumer and insurance company that the repair was done using an approved part. The body shop may then receive a windfall of profits by using substandard, and often unsafe, parts but charging higher fees often associated with approved parts.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present subject matter provides benefits by providing a way to test an automobile or parts of an automobile. In one exemplary and non-limiting embodiment for detecting an accident, a test signal is transmitted to an automobile, a response is detected, and then the response is analyzed to determine that the automobile has been damaged, e.g., by comparing the response signal with a baseline reference signal.

In another exemplary and non-limiting embodiment, an insurance company may process a claim by receiving an insurance claim to perform a repair on an automobile, send a request to test the automobile, and process the claim if the test response is within a certain range of an expected value. In another exemplary and non-limiting embodiment, a repair part may be approved by augmenting the repair part with a testable indicator, testing the testable indicator to create a baseline test signal, storing the baseline test signal along with a serial number of the repair part to create a record, and testing the unknown repair part to determine if the unknown repair part is the first repair part.

Other features of the subject matter are described below.

BRIEF DESCRIPTION OF THE DRAWINGS

The foregoing summary, as well as the following detailed description of the subject matter is better understood when read in conjunction with the appended drawings. For the purposes of illustration, there is shown in the drawings exemplary embodiments; however, these embodiments are not limited to the specific methods and instrumentalities disclosed. In the drawings.

DETAILED DESCRIPTION

Certain specific details are set forth in the following description and figures to provide a thorough understanding of various embodiments of the subject matter. Certain well-known details often associated with computing and software technology are not set forth in the following disclosure to avoid unnecessarily obscuring the various embodiments of the subject matter. Further, those of ordinary skill in the relevant art will understand that they can practice other embodiments of the subject matter without one or more of the details described below. Finally, while various methods are described with reference to steps and sequences in the following disclosure, the description as such is for providing a clear implementation of embodiments of the subject matter, and the steps and sequences of steps should not be taken as required to practice this subject matter.

As discussed above, testing all or part of an automobile or replacement parts for the automobile may be beneficial. For example, an insurance company may request that an automobile subject to an insurance claim be tested to determine that the automobile allegedly being repaired is the same automobile on record. In another example, an insurance company may request that an allegedly damaged portion of the automobile be tested to verify that the part is in fact damaged. In another example, a replacement part may be tested to verify the authenticity of the replacement part as part of an insurance claims process.

In order to test the particular part or the vehicle itself, a vehicle record may be established, for example as discussed below in reference to FIG. 4. If the vehicle record is for the entire automobile, the vehicle record may be recorded at the time of manufacturing before the automobile is sold. The vehicle record is a baseline indication against which something is tested against. Among other things, the vehicle record, and more particularly the baseline indication, provides an indication to a current test being performed of the authenticity of the thing being tested.

Figure 1:
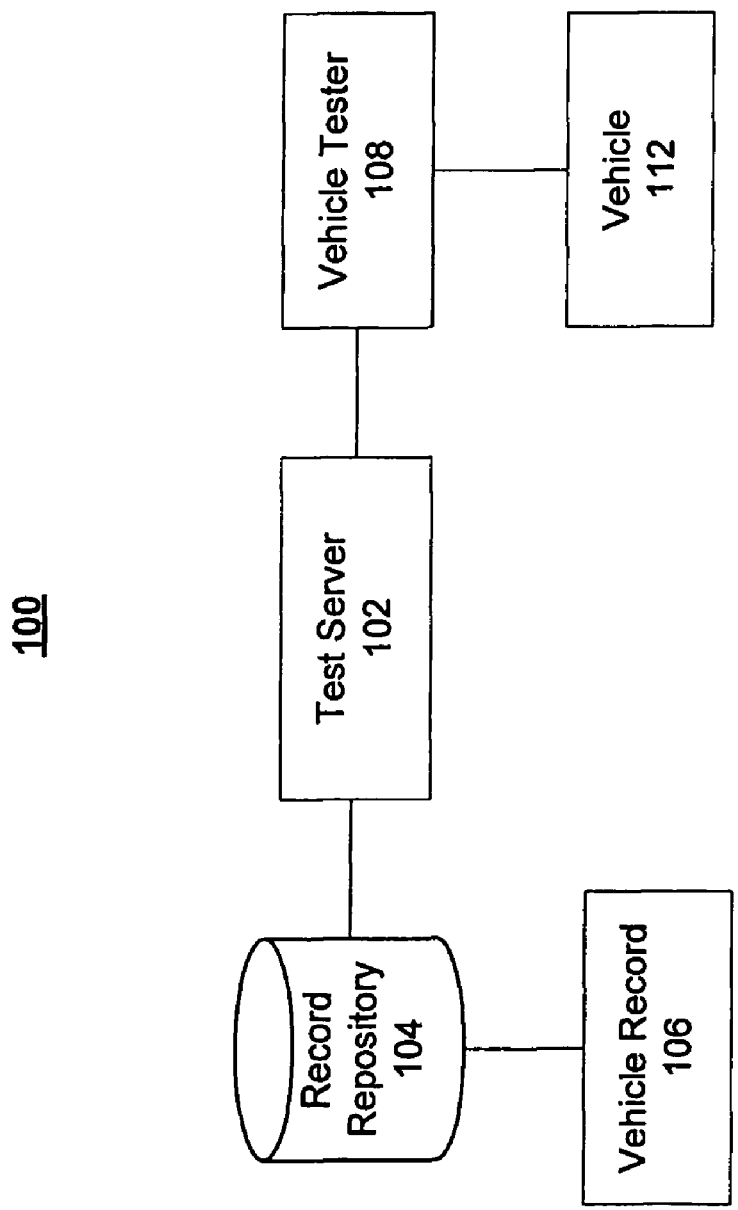
FIG. 1 is an illustration of an exemplary and non-limiting embodiment of a system for testing a vehicle.

For example, to test a vehicle, system 100 of FIG. 1 may be used to test a vehicle. Certain exemplarity and non-limiting embodiments of various subsystems of system 100 may be found in the descriptions of various figures, below. There may be an occasion upon which the authenticity of vehicle 112 may need to be determined. For example, an insurance repair claim may be submitted and the insurance company may want to verify that the vehicle being repaired is the same vehicle of record. In another example, a person may wish to test vehicle 100 prior to sale to verify that the vehicle has maintained the same baseline. This may be useful to determine if vehicle 112 has been damaged and cosmetically repaired.

Vehicle 112 is subjected to testing through the use of vehicle tester 108. The manner in which vehicle 112 is tested by vehicle tester 108 may vary. For example, vehicle tester 108 may use a magnetic field, as described with reference to FIG. 4, below. Vehicle tester 108 may also use radio frequency waves to interrogate radio frequency identification devices embedded within vehicle 112, as described with reference to FIG. 3 below.

In another example, vehicle tester 108 may impart a current into a circuit overlaid on the automobile. Changes in the automobile's structure resulting in a change in the circuit may change a measurement performed on the circuit. For example, the circuit may be energized and an inductance measured. In another example, various resistive elements or other electrical components may be dispersed in the circuit. When one or more of the elements are removed from the circuit, e.g. through the result of an accident destroying the element, a measurement after the accident may be measurably different.

Vehicle tester 108 tests vehicle 112 and outputs the testing data to test server 102. Test server 102 is configured to access record repository 104, which has within its records vehicle record 106 for vehicle 112. The testing data received from vehicle tester 108 is compared against baseline data retrieved from vehicle record 106. If the data is the same, or within a specified tolerance, the vehicle may be authenticated as the correct automobile. Additionally, if a claim has been submitted for a major repair on vehicle 112, and the testing data and the baseline data are the same, there may be an indication that vehicle 112 is not actually damaged and that a fraudulent submission of an insurance claim has occurred.

Figure 2:
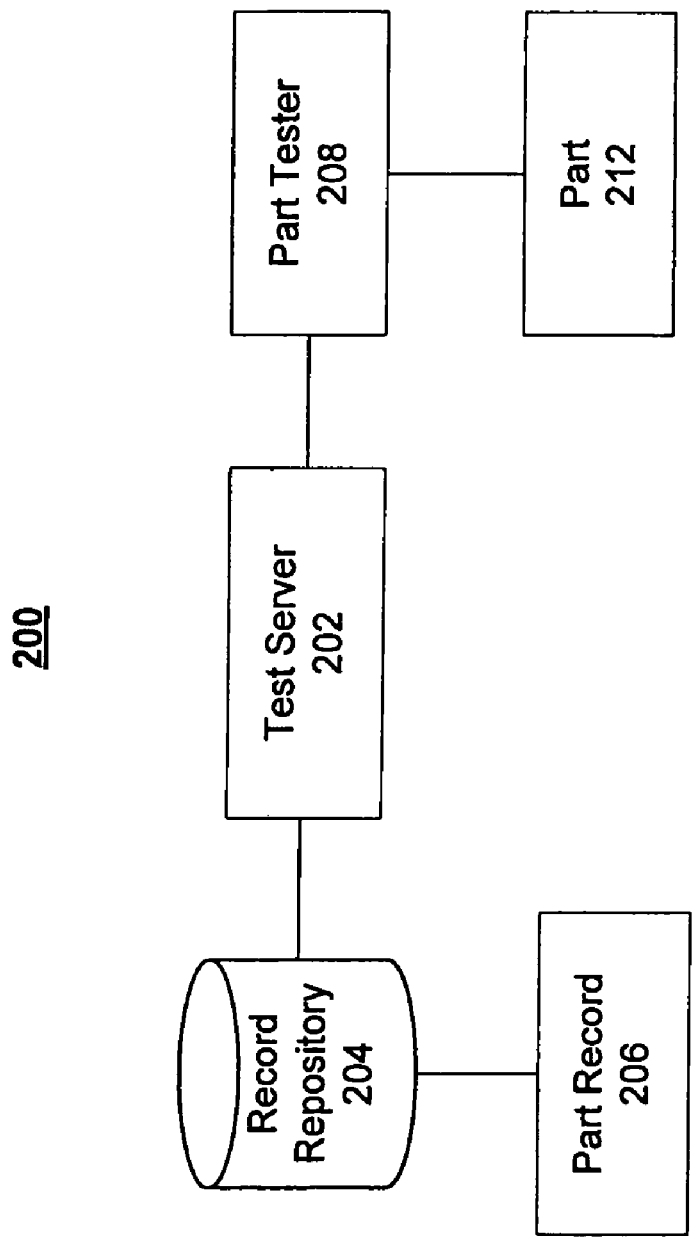
FIG. 2 is an illustration of an exemplary and non-limiting embodiment of a system for testing a vehicle part.

FIG. 2 illustrates system 200, an exemplary and non-limiting system in which a part may be tested. Part 212 is subjected to testing via part tester 208. The testing results are transmitted to test server 202 for comparison to a baseline signal found in part record 206 stored in record repository 204. A manufacturer may test the part after manufacturing and prior to shipping to generate a baseline for the part. A reason for this is that fraud may most often be found in connection with replacement parts on automobiles.

For example, a body shop may tell a customer that the part being used is a genuine part approved of by a car manufacturer, when in fact the part may be an unsafe part made by an unapproved manufacturer. To reduce the possibility of fraud, parts manufacturers often put serial numbers on their parts or provide other cosmetic indication that the part is a genuine part, for example, a sticker or emblem. Unfortunately, these cosmetic indicia may be fraudulently applied to the part. To reduce the possibility, the manufacturer of the part may test the part as soon as the part leaves the manufacturing facility to determine a baseline. The baseline may be difficult to copy, as the test may be used to show the actual construction of the part, rather than cosmetically applied indicia.

Figure 3:
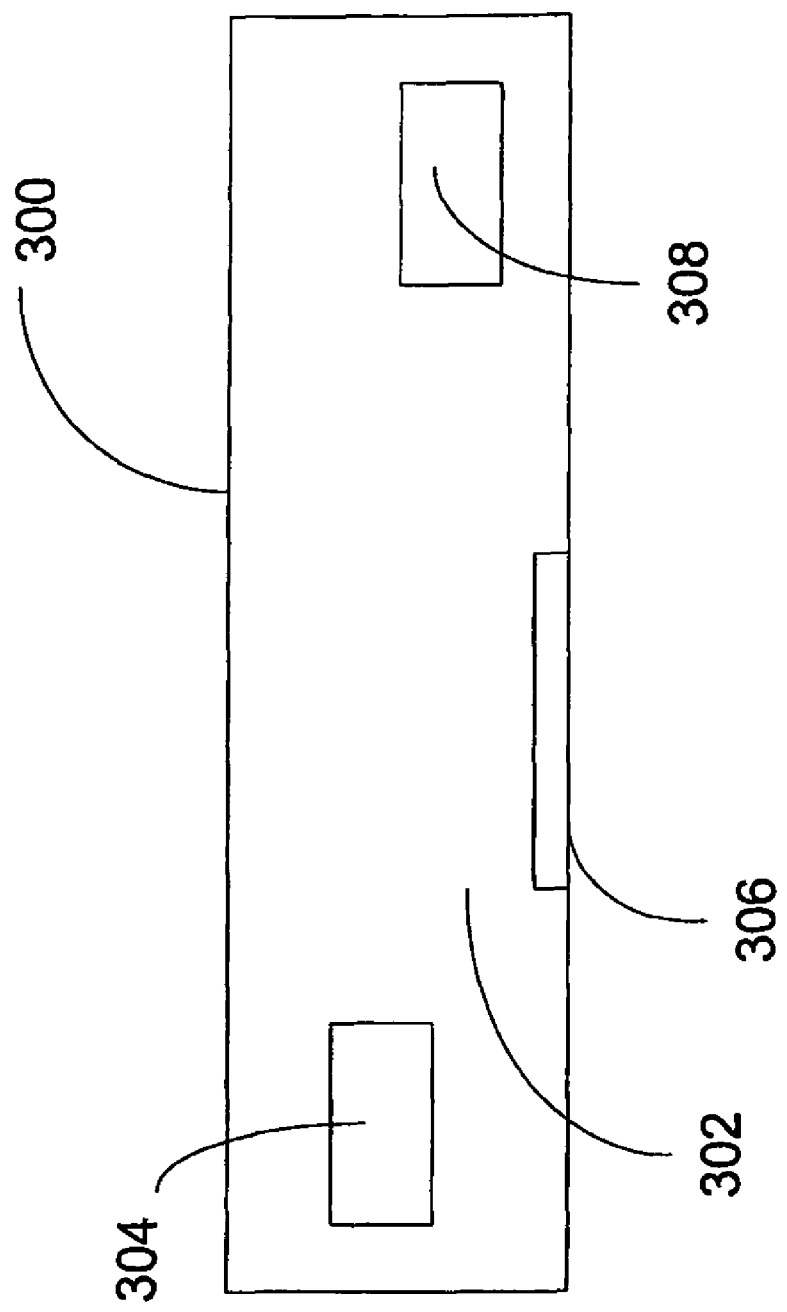
FIG. 3 is an illustration of a cross section of paint having radio frequency identification devices mixed in with the paint.

If the testing standards were stringent enough, unless the unapproved part was manufactured to have the exact same testing structure as the authentic part, it may be difficult to pass the fake part on as an authentic part. For example, FIG. 3 is illustrative of a cross-section of paint sample 300 taken from an automobile part. Radio frequency identification (RFID) tags 304 and 308 were mixed with paint 300 prior to applying the paint to the part. Also shown is RFID tag 306 which is an RFID tag that is painted on the part. The position, identification, and possibly existence, of RFID tags 304, 306 and 308 may be difficult to determine. If paint sample 300 was associated with a particular part number, it may therefore be difficult to copy the authentic part.

If paint sample 300 is paint applied to a part, paint sample 300 may be tested using part tester 208 of FIG. 2. For example, U.S. Pat. No. 7,068,170, assigned to the Boeing Company, discusses RFID tags that can be mixed with paint. Part tester 208 may be a radio frequency transmitter and RFID tags 304, 306, and 308 may be passive RFID tags. Although there are several types of RFID tags, a passive RFID tag may have an antenna and an integrated circuit. When a certain radio frequency is received by the antenna on a passive RFID tag, i.e. interrogated, the IC is energized by the signal and generates a response signal that identifies the device. Part tester 208 may be used to test RFID tags 304, 306, and 308.

Another way in which the manufacturing of something may be used as an identifier is through the use of magnetic field disturbance detector. For example, U.S. Pat. No. 7,113,092, assigned to QinetiQ Limited, discusses the use of magnetic fields to identify objects. Whenever an object is placed within a magnetic field, the magnetic field distorts. This is called magnetic field disturbance. A rudimentary example may be found in use to time traffic lights. A loop is placed under the concrete in a traffic stop. The loop is energized to create a magnetic field. When a vehicle comes to a stop over the loop, or a portion of the loop, the disturbance of the magnetic field is detected and an input is transmitted to a control box to indicate the presence of a vehicle.

On a smaller scale, because there may be inherent differences in the construction of items, the magnetic field disturbance caused by those items may vary, thus providing a baseline against which an unknown item, such as an automobile replacement part, may be tested against. FIG. 4 is a system that may be used to create a baseline for an automobile. Shown is automobile 400, which have just come off the production lot. As automobile 400 moves along axis X-Y, from "X" to "Y", automobile 400 passes through vehicle tester 402. Vehicle tester 402 creates a magnetic field (not shown) that is disturbed when automobile 400 passes through the field.

As automobile 400 passes through the field, the disturbance of the field is recorded as the baseline for automobile 400. The baseline is transmitted to test server 404, which stores the baseline in vehicle record 408 in record repository 406. If automobile 400 is tested in the future, the resulting future tests may be compared against vehicle record 408. A use may be when processing an insurance claim. If an insurance claim is submitted indicating that extensive damage has occurred, but a test reveals minor damage indicated by a smaller comparative difference in disturbance between the baselines and tested signal than what was expected, a fraudulent condition may be indicated.

Figure 5A:
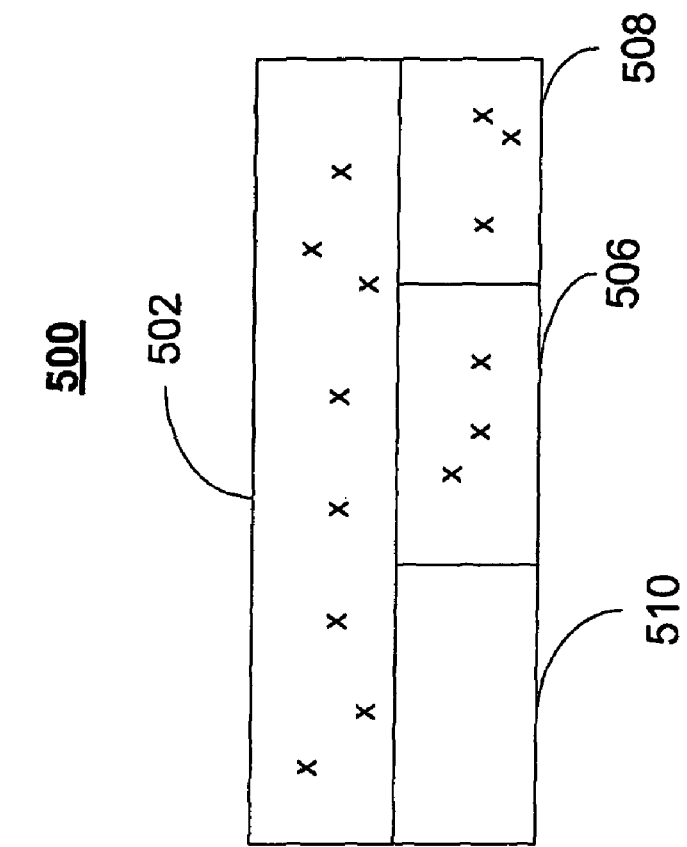
FIGS. 5 and 5a are comparative illustrations of parts of an automobile tested before the replacement of one of the parts and after the replacement.
Figure 5:
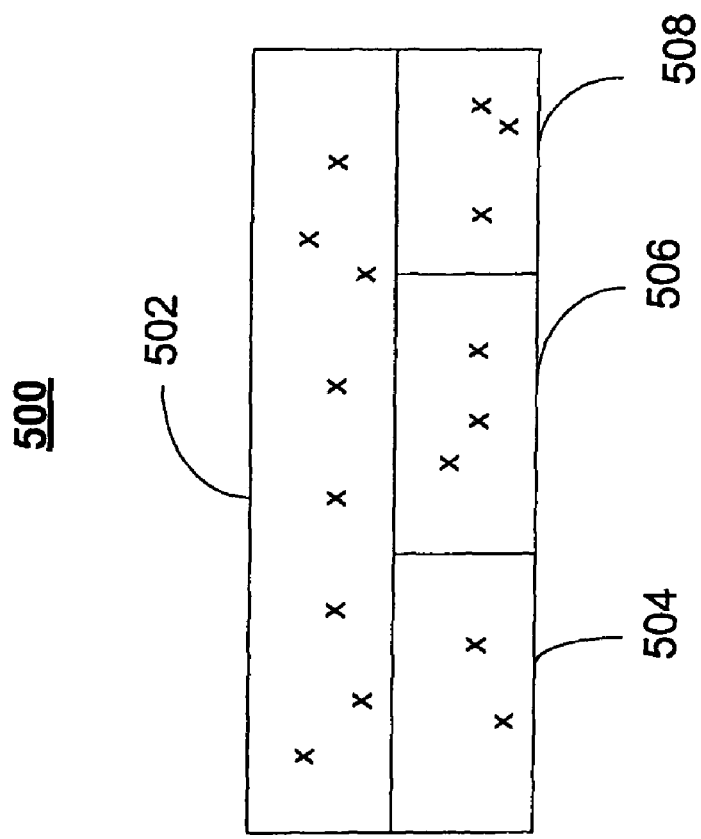

Another way to test for damage is the use of RFID tags, as described above. FIG. 5 is an illustration of a side view of an automobile. Top panel 502, front panel 504, middle panel 506, and end panel 508 each have RFID tags, each shown as an "x" in FIG. 5, mixed with the paint applied to their particular surfaces. The panels were tested and the particular patterns of the RFID tags are stored as a baseline.

By way of example, a person wishes to purchase the automobile. The person takes the automobile to a body shop for testing to determine if any unknown repairs have been made to the automobile. The body shop tests the automobile, resulting in the test pattern of FIG. 5a. As shown, panels 502, 506 and 508 are similar to the baseline shown in FIG. 5. The test indicated that panel 510 lacks any RFID tags. When compared to the baseline panel 504 of FIG. 5, the lack of RFID tags in the tested panel 510 may indicate that damage has occurred necessitating the replacement of panel 510.

Figure 4:
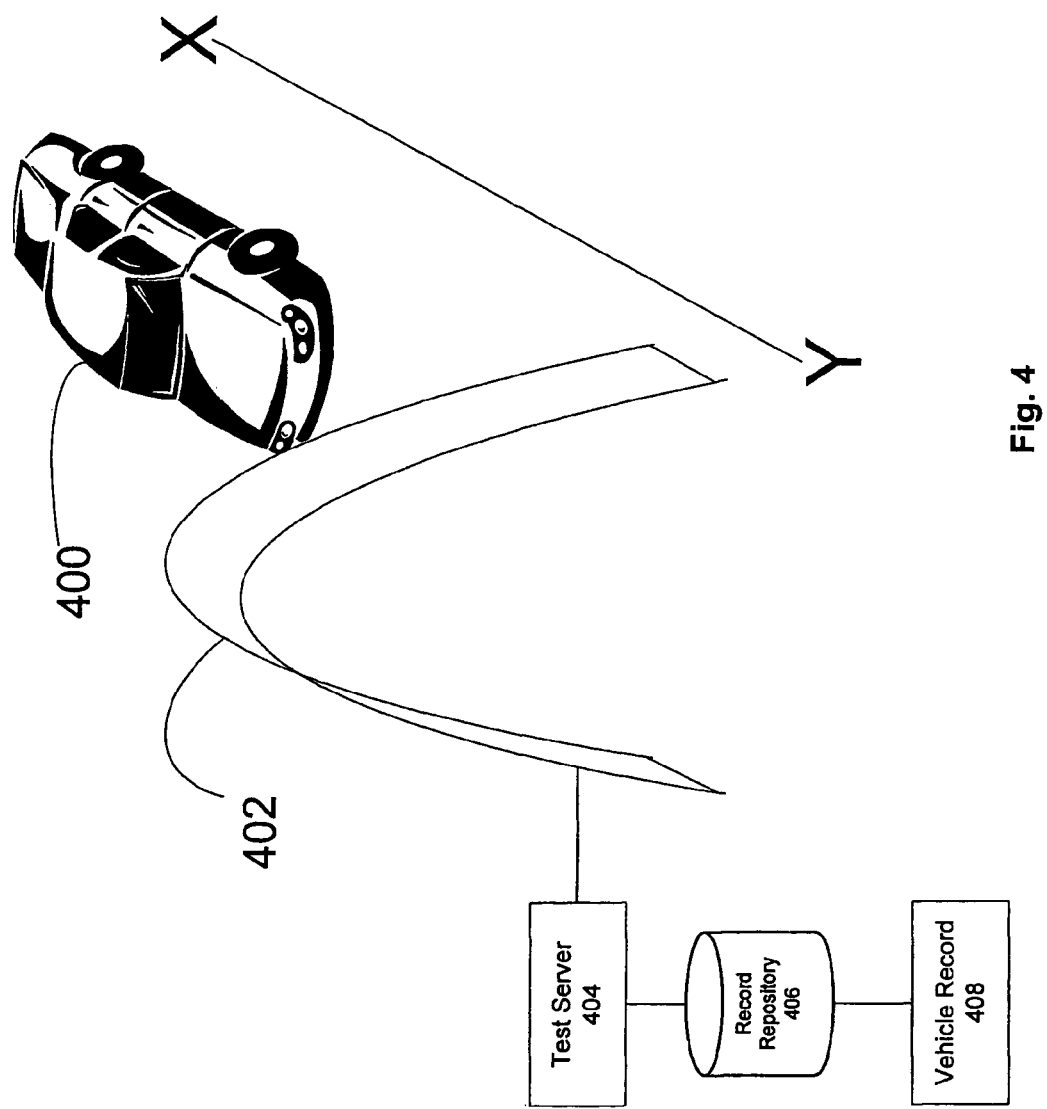
FIG. 4 is an illustration of an exemplary and non-limiting embodiment of a system for creating a baseline magnetic signature for an automobile.
Figure 6:
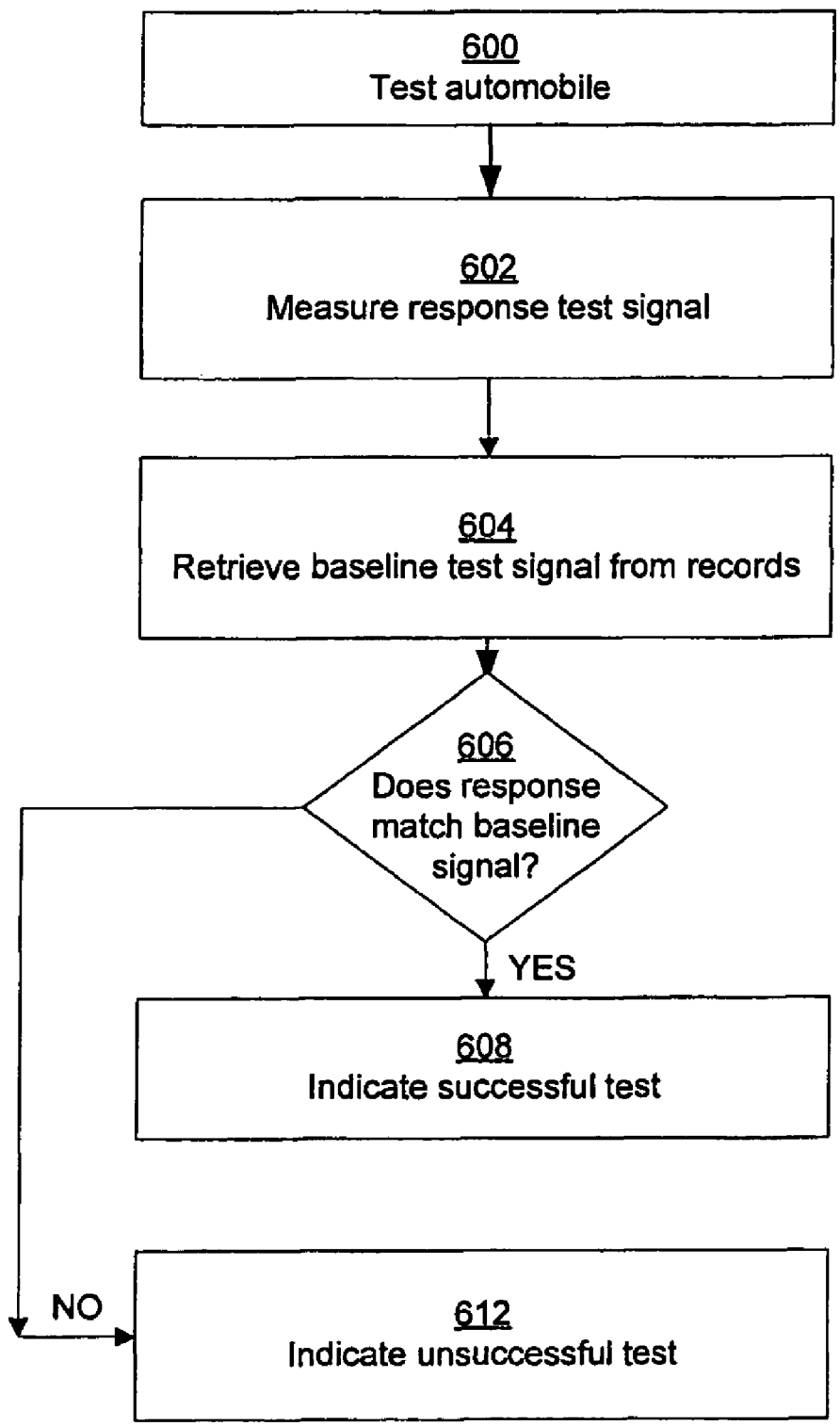
FIG. 6 is a flowchart of an exemplary and non-limiting way in which an automobile may be tested.

FIG. 6 is a flowchart of an exemplary way in which an automobile may be tested, for example, by using the testing system of FIG. 4. A vehicle is selected 600 for testing and tested. A response signal is measured 602. If the testing signal is magnetic, the response signal may be the disturbance of the magnetic field. If the testing signal is a radio frequency transmission to interrogate RFIDs, the response signal may be the transmitted signal from the RFIDs or, as indicated in FIG. 5a, a lack of a response signal.

After the response signal is measured, a baseline signal against which the response signal will be compared is retrieved from a record 604. The response and baseline signals are compared 606, and if they match, a successful test may be indicated 608. If the signals do not match, an unsuccessful test may be indicated. A success may be the authentication or verification of the automobile or the verification that the automobile is damaged.

When comparing the two signals, the test signal and the baseline signal, there may be deviations between the signals not caused by conditions being tested. For example, through normal wear and tear, some of the RFIDs in the paint may degrade over time and may stop working. In another example, through the use of the automobile, the metal in an automobile may naturally flex and twist, thus changing the structure of the automobile. Through normal usage, the test signal may be different than that baseline signal. Further, the difference in testing equipment may cause differences between the two signals.

These differences may be tested and used as a range in which the testing signal may compare with the baseline signal and still indicate a successful test. For example, it may be known that a fourth of the RFID tags in a particular body panel will degrade over time. If the testing signal indicates that approximately, or more than, three quarters of the RFID tags remain, the test may be successful. Therefore, even though the number of RFID tags has decreased, the test signal still indicates a condition that is within tolerance.

Figure 7:
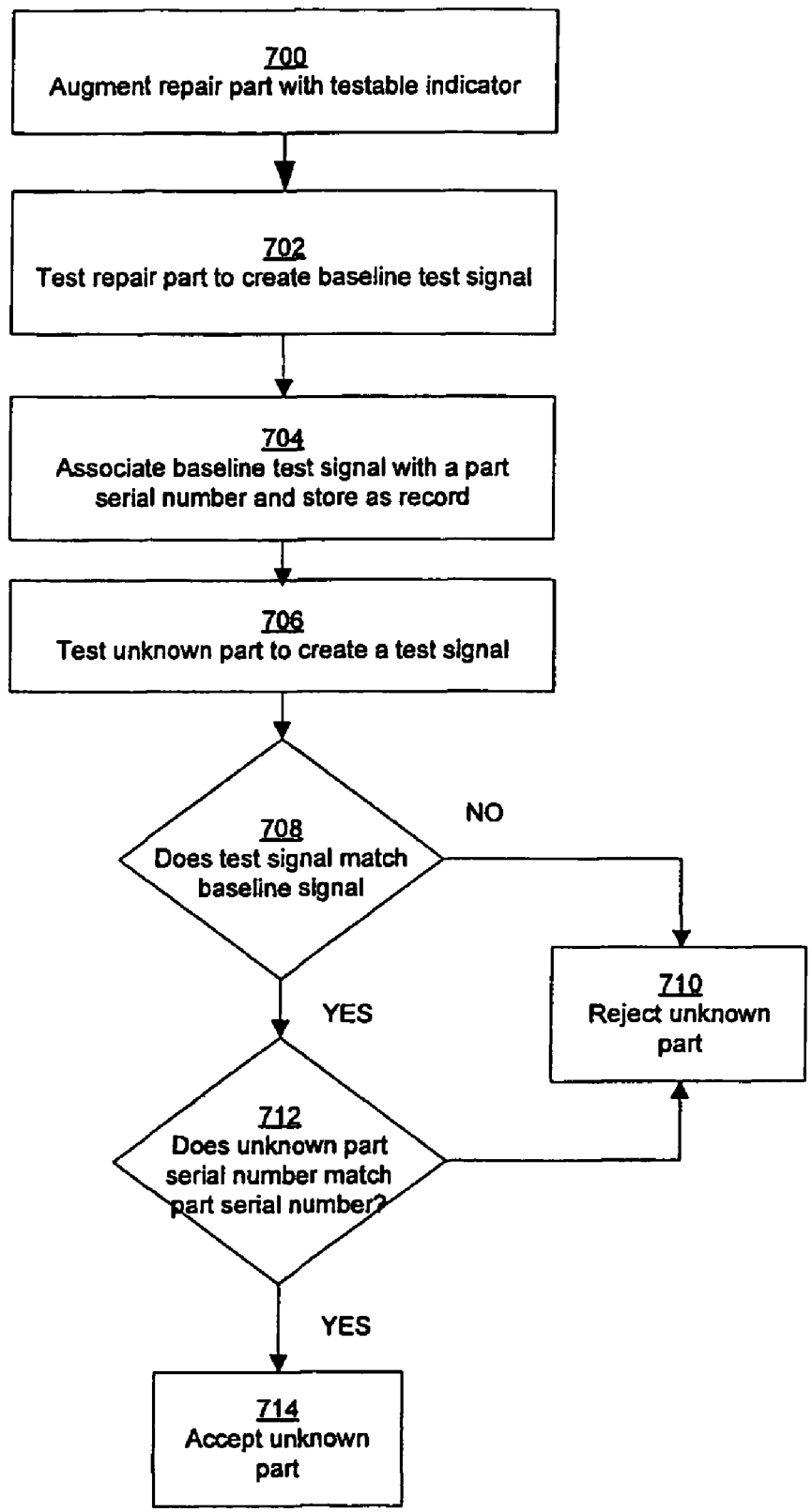
FIG. 7 is a flowchart of an exemplary and non-limiting way in which the authenticity of a replacement part can be verified.

FIG. 7 is a flowchart of an exemplary way in which a part may be augmented to reduce fraud. A repair part is augmented with a testable indicator. The testable indicator may be an RFID tag that can receive and transmit radio frequency waves. The RFID tag may be painted onto the part. The part may then be tested 702 to create a baseline test signal. The baseline test signal is associated with a part serial number and stored 704 as the part record. Most repair parts have stamped or printed on them a number which identifies the particular part. This number may be used in conjunction with the baseline test signal as the record.

An unknown part is tested 706. For example, at a body shop, a technician may be preparing to install the part and may wish to verify that the part is authentic. The part is then tested 706 and a test signal is created. The test signal, a response to the application of the baseline signal, is compared 708 to the baseline signal. If the test signals do not match, the part may be rejected 710. If the baseline signal matches the testing signal, the serial number of the part is compared 712 to the serial number in the record for the part. If the serial numbers match, the part may be accepted 714. If the serial numbers do not match, the part may be rejected 710.

Figure 8:
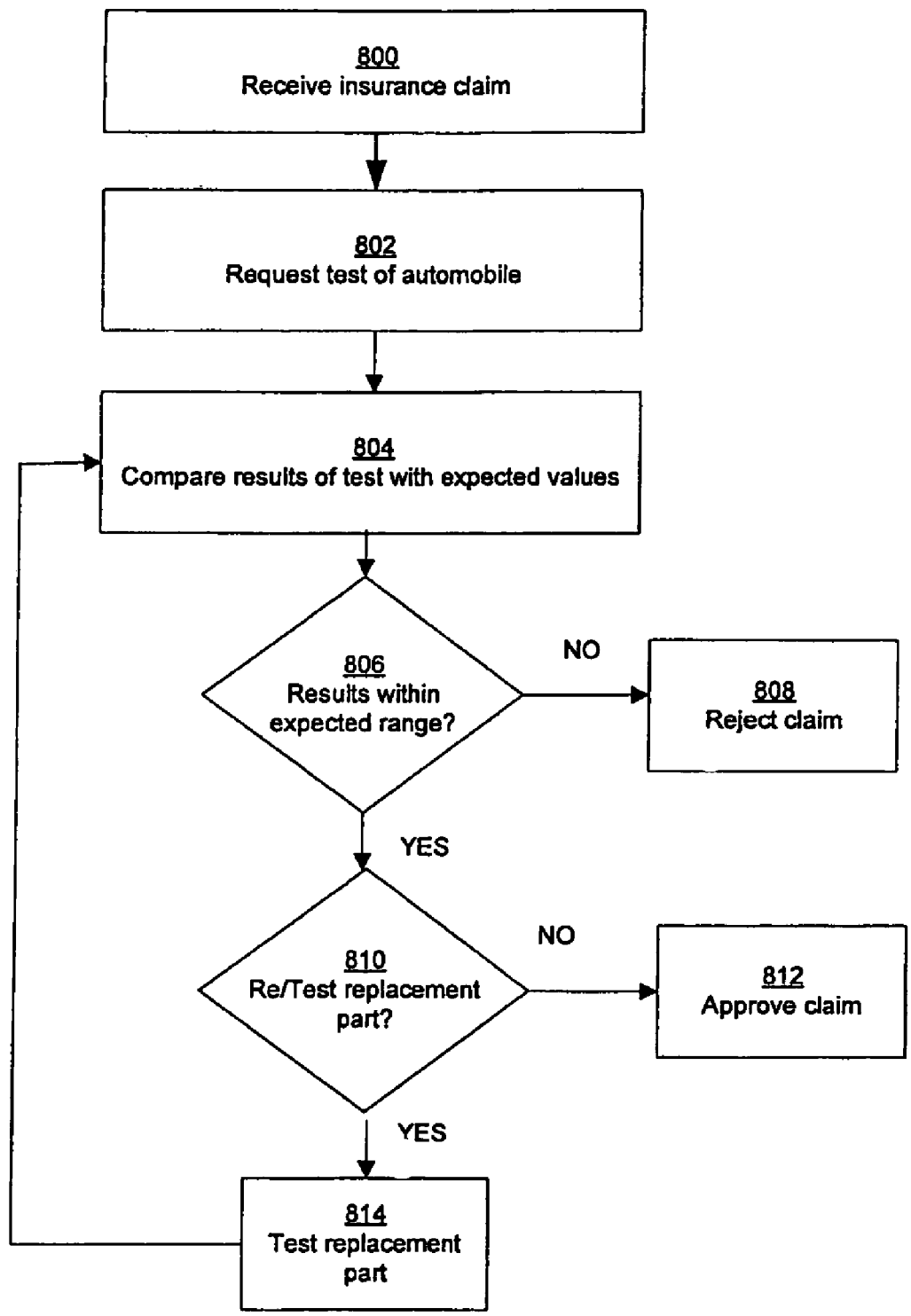
FIG. 8 is a flowchart of an exemplary and non-limiting way in which an insurance claim may be processed.

An insurance company may also desire to test an automobile when processing an insurance claim. FIG. 8 is an exemplary method in which an insurance company may process a claim. The insurance company may receive 800 an insurance claim from a client. To attempt to reduce fraud, the insurance company may initiate a program whereby, depending upon the amount of the claim requested, the automobile is to be tested. If desired, the insurance company sends a request to test the automobile. The results are compared 804 with expected results 806. The expected results may be the baseline test signals created when the automobile is manufactured.

If the tested results are not within a range of the expected results, the claim may be rejected 808. If the tested results are within a range of the expected results, the replacement part may be tested 808. If the replacement part is not to be tested, and the automobile test is within expected ranges, the claim may be approved 812. If the replacement part is to be tested, the replacement part is tested 814 and the test is compared 804 to expected values. If the results are within range 806, the part may be retested 810 or the claim may be approved 812.

Although there may be several reasons that a part may be retested after a test indicated an expected result, an insurer, or another entity using the test, may wish that multiple tests be performed as an added layer of fraud protection. For example, if the baseline results were somehow stolen and submitted as the testing results, testing one time may allow a fraudulent insurance claim to proceed. If the same testing results were submitted, the testing results could be compared to each other. Minor deviations may be expected from test to test. If the test results are exactly the same from test to test, this may indicate a fraudulent test being performed.

The methods and apparatus of the present subject matter may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the subject matter. When implemented on a general-purpose processor, the program code combines with the processor to provide a unique apparatus that operates to perform the functionality of the present subject matter.

While the present subject matter has been described in connection with the preferred embodiments of the various figures, it is to be understood that other similar embodiments may be used or modifications and additions may be made to the described embodiments for performing the same function of the present subject matter without deviating there from. Furthermore, it should be emphasized that a variety of computer platforms, including handheld device operating systems and other application-specific hardware/software interface systems, are herein contemplated, especially as the number of wireless networked devices continues to proliferate. Therefore, the present subject matter should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present subject matter should not be limited to specific embodiments described herein but instead construed most broadly.

What is claimed is:

1. A method for an insurance company to process an insurance claim submitted by a customer, comprising:
    executing program code on one or more machines to perform:
        receiving an insurance claim to perform a repair of a part on an automobile;
        determining an amount of the insurance claim;
        depending on the amount of the insurance claim, sending a request to test the automobile, wherein the test comprises:
            transmitting a first testing signal to the part;
            determining a first response to the first testing signal, wherein the first response indicates a first number of radio-frequency identification (RFID) tags mixed in with paint applied to a surface of the part;
            comparing the first response to a first expected value, wherein the first expected value indicates an expected number of remaining RFID tags;
            transmitting a second testing signal to the part;
            determining a second response to the second testing signal, wherein the second response indicates a second number of radio-frequency identification (RFID) tags mixed in with paint applied to the surface of the part; and
            comparing the first number of RFID tags to the second number of RFID tags to determine whether a minor deviation exists between the first and second numbers; and
        approving the insurance claim when the first and second numbers are within a predefined range of the first expected value, and when the minor deviation exists between the first and second numbers; and
        processing the insurance claim.

2. The method of claim 1, wherein the part is a body panel of the automobile.

3. The method of claim 2, wherein the first expected value is a value that indicates that the body panel is damaged.

4. The method of claim 1, wherein the first expected value is a value created when the automobile was tested proximate to the time of manufacturing.

5. The method of claim 1, wherein executing program code on the one or more machines causes the one or more machines to perform testing a replacement part for the part, wherein the testing the replacement part comprises:
    transmitting a third testing signal to the replacement part;
    determining a third response to the third testing signal;
    comparing the third response to a second expected value; and
    authenticating the replacement part if the third response is within a certain range from the second expected value.

6. The method of claim 1, wherein executing program code on the one or more machines causes the one or more machines to perform denying the insurance claim if the first response is not within a certain range from the first expected value.

7. The method of claim 1, wherein the test further comprises:
    comparing the first response to a test pattern of RFID tags to determine whether an arrangement of RFID tags has changed;
    identifying a change in the arrangement of RFID tags; and
    recommending replacement of the part based on the change.

8. A computer-readable storage medium having computer-readable instructions stored thereon for an insurance company to process an insurance claim submitted by a customer, the computer-readable instructions comprising instructions to:
    receive an insurance claim to perform a repair of a part on an automobile;
    determine an amount of the insurance claim;
    depending on the amount of the insurance claim, send a request to test the automobile, wherein the test comprises:
        transmitting a first testing signal to the part;
        determining a first response to the first testing signal, wherein the first response indicates a first number of radio-frequency identification (RFID) tags mixed in with paint applied to a surface of the part;
        comparing the first response to a first expected value, wherein the first expected value indicates an expected number of remaining RFID tags;
        transmitting a second testing signal to the part;
        determining a second response to the second testing signal, wherein the second response indicates a second number of radio-frequency identification (RFID) tags mixed in with paint applied to the surface of the part; and
        comparing the first number of RFID tags to the second number of RFID tags to determine whether a minor deviation exists between the first and second numbers; and
    approve the insurance claim when the first and second numbers are within a predefined range of the first expected value, and when the minor deviation exists between the first and second numbers; and
    process the insurance claim.

9. The computer-readable storage medium of claim 8, wherein the part is a body panel of the automobile.

10. The computer-readable storage medium of claim 9, wherein the first expected value is a value that indicates that the body panel is damaged.

11. The computer-readable storage medium of claim 8, wherein the first expected value is a value created when the automobile was tested proximate to the time of manufacturing.

12. The computer-readable storage medium of claim 8, further comprising instructions to:
    transmit a third testing signal to a replacement part;
    determine a third response to the third testing signal;
    compare the third response to a second expected value; and
    authenticate the replacement part if the third response is within a certain range from the second expected value.

13. The computer-readable storage medium of claim 8, further comprising instructions for denying the insurance claim if the first response is not within a certain range from the first expected value.

14. The computer-readable storage medium of claim 8, wherein the instructions to test further comprise instructions to:
    compare the first response to a test pattern of RFID tags to determine whether an arrangement of RFID tags has changed;
    identify a change in the arrangement of RFID tags; and
    recommend replacement of the part based on the change.

15. A system for an insurance company to process an insurance claim submitted by a customer, comprising at least one subsystem that:
- receives an insurance claim to perform a repair of a part on an automobile;
- determines an amount of the insurance claim;
- depending on the amount of the insurance claim, sends a request to test the automobile, wherein the test comprises:
  - transmitting a first testing signal to the part;
  - determining a first response to the first testing signal, wherein the first response indicates a first number of radio-frequency identification (RFID) tags mixed in with paint applied to a surface of the part;
  - comparing the first response to a first expected value, wherein the first expected value indicates an expected number of remaining RFID tags;
  - transmitting a second testing signal to the part;
  - determining a second response to the second testing signal, wherein the second response indicates a second number of radio-frequency identification (RFID) tags mixed in with paint applied to the surface of the part; and
  - comparing the first number of RFID tags to the second number of RFID tags to determine whether a minor deviation exists between the first and second numbers; and
- approves the insurance claim when the first and second numbers are within a predefined range of the first expected value, and when the minor deviation exists between the first and second numbers; and
- processes the insurance claim.

16. The system of claim 15, wherein the part is a body panel of the automobile.

17. The system of claim 16, wherein the first expected value is a value that indicates that the body panel is damaged.

18. The system of claim 15, wherein the first expected value is a value created when the automobile was tested proximate to the time of manufacturing.

19. The system of claim 15, further comprising at least one subsystem that:
- transmits a third testing signal to a replacement part;
- determines a third response to the testing signal;
- compares the third response to a second expected value; and
- authenticates the replacement part if the third response is within a certain range from the second expected value.

20. The system of claim 15, further comprising at least one subsystem that denies the insurance claim if the first response is not within a certain range from the first expected value.

21. The system of claim 15, further comprising at least one subsystem that:
- compares the first response to a test pattern of RFID tags to determine whether an arrangement of RFID tags has changed;
- identifies a change in the arrangement of RFID tags; and
- recommends replacement of the part based on the change.

* * * * *